United States Patent [19]

Reinhardt

[11] Patent Number: 4,553,391

[45] Date of Patent: Nov. 19, 1985

[54] CONTROL DEVICE FOR A HYDRAULIC CYLINDER FOR MAINTAINING THE PULLING FORCE THEREOF CONSTANT

[75] Inventor: Peter Reinhardt, Lohr/Main, Fed. Rep. of Germany

[73] Assignee: Mannesmann Rexroth GmbH, Fed. Rep. of Germany

[21] Appl. No.: 551,901

[22] Filed: Nov. 15, 1983

[30] Foreign Application Priority Data

Nov. 30, 1982 [DE] Fed. Rep. of Germany ....... 3244191

[51] Int. Cl.$^4$ .......... F16D 31/02

[52] U.S. Cl. .......... 60/413; 60/419

[58] Field of Search .......... 60/419, 408, 431, 414, 60/477, 325, 413

[56] References Cited

U.S. PATENT DOCUMENTS 2,928,376 3/1960 Levetus .......... 60/408 X 3,626,695 12/1971 Jonsson .......... 60/431

4,026,107 5/1977 Kosek et al. .......... 60/414 X

*Primary Examiner*—Edward K. Look

*Attorney, Agent, or Firm*—Harness, Dickey & Pierce

[57] ABSTRACT

A hydrostatic machine having a fixed displacement volume which is connected to the operating chamber of a hydraulic cylinder which machine is mechanically coupled to a second hydrostatic machine having a variable displacement volume to control the force exerted by the hydraulic cylinder. When control liquid is displaced from the working chamber of the cylinder the first machine acting as a motor drives the second machine which displaces control liquid into an accumulator. Vice versa, liquid is taken from the accumulator and the second machine acting as a motor drives the first machine which feeds liquid into the working chamber. The pressure in the working chamber, or, respectively, the force exerted by the cylinder is maintained constant by a corresponding adjustment of the displacement volume of the second machine.

4 Claims, 3 Drawing Figures

CONTROL DEVICE FOR A HYDRAULIC CYLINDER FOR MAINTAINING THE PULLING FORCE THEREOF CONSTANT

BACKGROUND OF THE INVENTION

The present invention relates in general to a control apparatus for maintaining constant the pulling force of a hydraulic cylinder.

It is known in the art to use control means of this type to maintain a predetermined pulling force in particular for cables or ropes. The rope is guided around a pulley to form a loop which pulley is connected to a hydraulic cylinder for adjustment. Fast movements of the cable are compensated for by the cylinder which piston extends or, respectively, retracts the pulley to decrease or increase the length of the cable loop. Under the condition that the pulley force or tie load of the rope shall be kept constant during the movements the pressure in the working chamber of the cylinder must be maintained constant independent of the position of the guide pulley.

Preferably, control means of this type are used on vessels for drawing cables or ropes which are connected to other stationary or movable devices. In addition to the constant pulling force control, a cable drum is provided which is driven to compensate for slow movements of the cable or rope.

According to a prior art control called Mooring a hydrostatic machine having a variable displacement volume is operated by being pressure controlled. The machine either operates as a pump or as a motor depending on whether control liquid is sucked into the working chamber in extending the piston or is displaced from the working chamber in retracting the piston. A substantial drawback of this control apparatus is the high power loss.

It is further known to connect the working chamber of the hydraulic cylinder to an accumulator. Accordingly, control liquid is either fed into the accumulator or taken from the accumulator. Since the pressure depends on the size and characteristics of the accumulator a constant pulling force cannot be obtained. Further, as soon as the tractive power of the rope and thus the pressure changes, this results in difficulties.

SUMMARY OF THE INVENTION

It is an object of the present invention to provide a control means for a constant tie load of a draw means which allows to maintain a predetermined pressure.

It is a further object to avoid machinery causing power losses.

The present invention is defined by the claims attached, in particular claim 1.

According to the invention, the pressure in the working chamber of the cylinder may be maintained constant at any value without causing any power loss by supplemental drive means. With control liquid being displaced from the cylinder, the first machine operates as motor and thus drives the second machine which pumps liquid into the accumulator. Vice versa, the liquid returning from the accumulator drives the second machine, whereas the first machine operates as pump to return liquid to the liquid chamber. According to the invention, the control takes place by means of said pair of hydraulical machines which are but mechanically coupled to each other, but are hydraulically separated so that requirements which result from the size and the pressure of the hydraulic cylinder can be easily met by properly selecting the hydrostatic machines. Thus, the complexity and cost for a control of this type may be substantially decreased.

BRIEF DESCRIPTION OF THE DRAWINGS

Other objects and advantages of the present invention will become apparent to those skilled in the art from the following detailed description of the preferred embodiment of the invention wherein the single FIGURE shows a schematic view of a constant tractive power control for a hydraulic cylinder.

DETAILED DESCRIPTION OF THE PREFERRED EMBODIMENT

Figure 1:
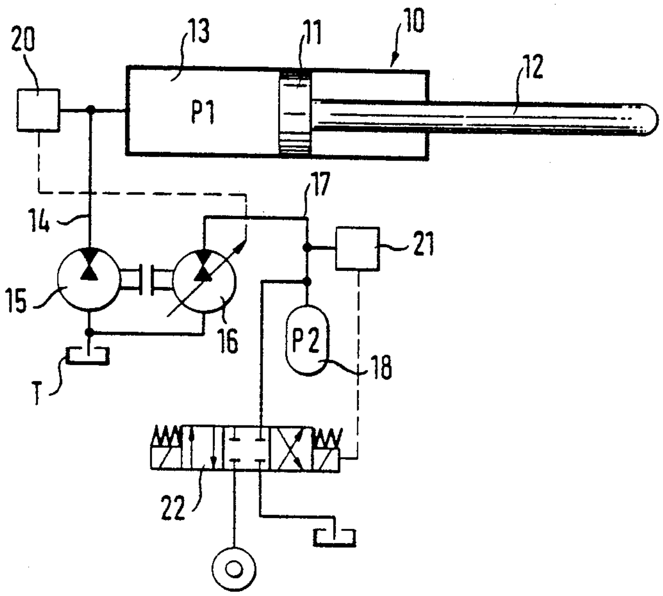
Figure 2:
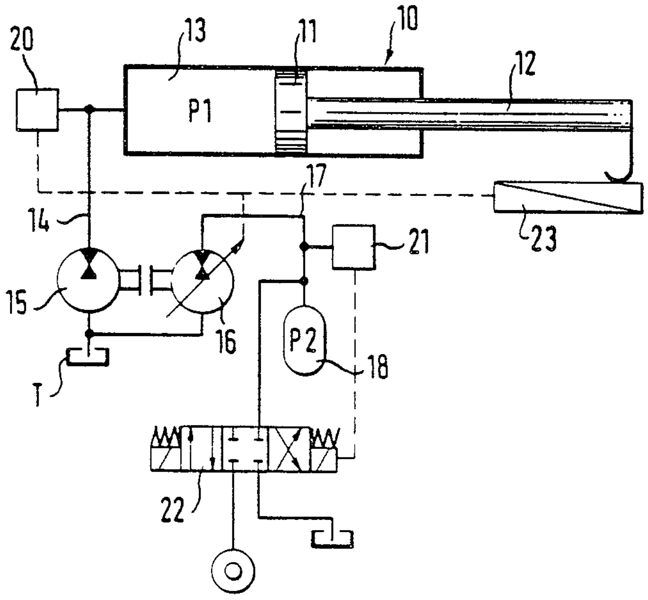
Figure 3:
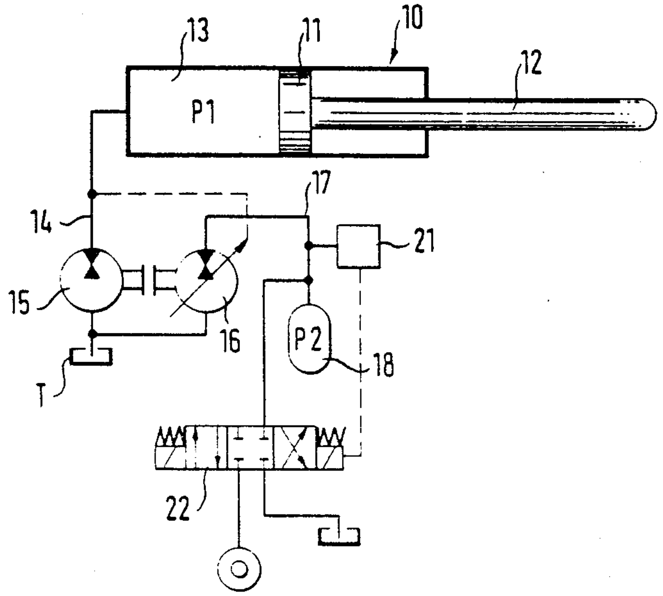

Referring to the drawing, a hydraulic cylinder 10 is shown which comprises a piston 11 which is connected to a piston rod 12, the free end thereof carrying a guide pulley which is not shown and around which a rope or cable is slung not shown alike to form a loop in a manner known per se which loop becomes shorter or longer when the piston 11 extends or, respectively, retracts, wherein the tie load acting on the rope shall be maintained constant.

The working chamber 13 of the cylinder 10 is connected through a line 14 to a first hydrostatic machine 15 having a constant displacement volume which machine is further connected to the liquid reservoir T.

A second hydrostatic machine 16 having a variable displacement volume is mechanically coupled to the first machine 15 which second machine is connected to the reservoir T and is further connected through a line 17 to an accumulator 18.

The pressure in the working chamber 13 of the cylinder 10 is determined by a pressure sensor 20 being connected to the line 14. The output voltage of the pressure sensor 20 represents a signal to adjust the adjusting member of the second machine 16. Details of the adjusting means are not shown and described. In a manner well known to the artisan, the adjusting member of the second machine for controlling displacement volume is an adjustment cylinder which is actuated by an electrohydraulical valve, which in turn is controlled by the pressure responsive output voltage of the pressure sensor 20. Accordingly, in response to the pressure P1 in the working chamber 13 and with the constant displacement volume Q1 of the first machine 15, the displacement volume Q2 of the second machine 16 and thus the pressure P2 in the accumulator 18 are changed so that the pressure P1 is maintained constant.

The control operates as follows: when the piston 11 retracts, the liquid being displaced from the working chamber 13 is fed via the first machine 15 into the reservoir T; thus the first machine operates as motor and drives the second machine 16 which operates as pump and supplies liquid from the reservoir T through the line 17 into the accumulator 18. The second machine generates a hydraulical resistance that high so that the pressure P1 in the cylinder has the value required. When the pressure P2 in the accumulator 18 is increased, the displacement volume of the pump 16 is decreased through the adjustment control so that the pressure P1 in the working chamber 13 is kept constant. It is apparent that the pressures P1 and P2 as well as the displacement volumes Q1 and Q2 of both machines follow the following equation:

$$P1{:}P2 = Q1{:}Q2.$$

Since Q1 is constant and P1 shall be maintained constant the pressure P2 and volume Q2 are inversely proportional.

In the reverse case, when the piston 11 extends, the first machine operating as pump supplies liquid from the reservoir into the working chamber 13. The drive energy for this is delivered by the second machine operating as motor which is driven by the liquid flowing from the accumulator 18. In the course of discharging the accumulator 18, the control means compensates for the pressure decrease P2 by increasing the displacement volume Q2 of the second machine.

To compensate for liquid losses by leaking of the second machine 16, the pressure in the accumulator is monitored by a pressure sensor 21. When the pressure falls below a predetermined minimum value, the line 17 is connected to a pressure source by means of a valve 22.

In the preferred embodiment the actual value for controlling the constant tie load is defined by the pressure P1 in the working chamber 13. However, since the stroke of the piston rod 12 or, respectively, the force being exerted by the piston rod are proportional to said pressure the actual value for adjusting the second machine 16 may be generated by a stroke sensor being actuacted by the piston rod 12 or by a force measuring means which are not shown instead of the pressure sensor 20 which is then eliminated.

Further, the adjusting member of the second machine 16 must not be necessarily electro-hydraulical through a valve. Rather, the adjusting cylinder for controlling the displacement value may be connected directly to the line 14 so that the pressure P1 directly acts on the piston of the adjusting cylinder.

According to the invention, any pressure P1 may be adjusted to be maintained constant by means of the hydrostatic machine 16 having a variable displacement volume. Furthermore, the pressure P1 may be modified depending on the movement of the piston rod 12, for example, so that in response to the position of the piston the pressure in the working chamber 13 may be varied in correspondingly adjusting the machine 16.

What is claimed is:

1. A control device for providing a hydraulic cylinder with a constant pulling force, in particular for cables and ropes drawn by vessels, comprising a first hydrostatic machine operable as a pump or a motor having a constant displacement volume, an accumulator and a second hydrostatic machine operable as a pump or a motor having a variable displacement volume, the working chamber of said hydraulic cylinder in communication with a first port of said first machine, another port of said first machine being in communication with a liquid reservoir, said accumulator being connected to a liquid reservoir via said second machine, mechanical means for drivingly coupling said first and said second machine for driving said first machine from said second machine when said second machine operates as a motor under pressure from said accumulator to cause movement of said hydraulic cylinder in one direction and for driving said second machine as a pump to charge said accumulator from said first machine acting as a motor when said cylinder moves in the opposite direction, and means to adjust the displacement volume of said second machine to maintain a constant force being exerted by the piston of said cylinder.

2. A control device according to claim 1, wherein the adjustment of said second machine takes place in response to the pressure prevailing in said working chamber of said cylinder.

3. A control device according to claim 1, wherein the adjustment of said second machine takes place in response to the stroke of the piston of said cylinder.

4. A control device according to claim 1, wherein the adjustment of said second machine takes place hydraulically or electro-hydraulically.

* * * * *